US012659745B2

(12) United States Patent (10) Patent No.: US 12,659,745 B2
Goel (45) Date of Patent: Jun. 16, 2026

(54) METHODS, SYSTEMS, AND COMPUTER READABLE MEDIA FOR INDICATING CONSUMER NETWORK FUNCTION (NF) TYPE FOR ACCESS TOKEN REQUESTS FORWARDED BETWEEN NF REPOSITORY FUNCTIONS (NRFs)

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 188 days.

(21) Appl. No.: 18/591,871

(22) Filed: Feb. 29, 2024

(65) Prior Publication Data

US 2025/0280294 A1 Sep. 4, 2025

(51) Int. Cl.
*H04L 29/00* (2006.01)
*H04W 12/084* (2021.01)
(52) U.S. Cl.
CPC ................................. *H04W 12/084* (2021.01)
(58) Field of Classification Search
CPC .................................................. H04W 12/084
USPC .......................................................... 726/6
See application file for complete search history.

(56) References Cited

U.S. PATENT DOCUMENTS

2022/0295282 A1* 9/2022 Rajput .................... H04W 8/18
2023/0019000 A1* 1/2023 Li ......................... H04W 12/08

OTHER PUBLICATIONS

"3rd Generation Partnership Project: Technical Specification Group Core Network and Terminals; 5G System; Network Function Repository Services; Stage 3 (Release 18)", 3GPP TS 29. 510, V18.4.0, pp. 1-399 (Sep. 2023).
"3rd Generation Partnership Project; Technical Specification Group Core Network and Terminals; 5G System; Technical Realization of Service Based Architecture; Stage 3 (Release 18)", 3GPP TS 29.500, V18.4.0, pp. 1-145 (Dec. 2023).
Hardt, "The OAuth 2.0 Authorization Framework", Internet Engineering Task Force (IETF), Request for Comments: 6749, pp. 1-76 (Oct. 2012).

* cited by examiner

*Primary Examiner* — Jeffrey C Pwu
*Assistant Examiner* — Michael D Anderson
(74) *Attorney, Agent, or Firm* — Jenkins, Taylor & Hunt, P.A.

(57) ABSTRACT

A method for indicating a consumer network function (NF) type for an access token request forwarded between NF repository functions (NRFs) includes receiving, by a forwarding NRF, an access token request. The method further includes determining, by the forwarding NRF, that the access token request requires forwarding. The method further includes determining, by the forwarding NRF, that the access token request does not identify an NF type of a consumer NF for which the access token request was issued. The method further includes determining, by the forwarding NRF, the consumer NF type identifier. The method further includes communicating, by the forwarding NRF, the consumer NF type identifier to a forwarded NRF.

16 Claims, 8 Drawing Sheets

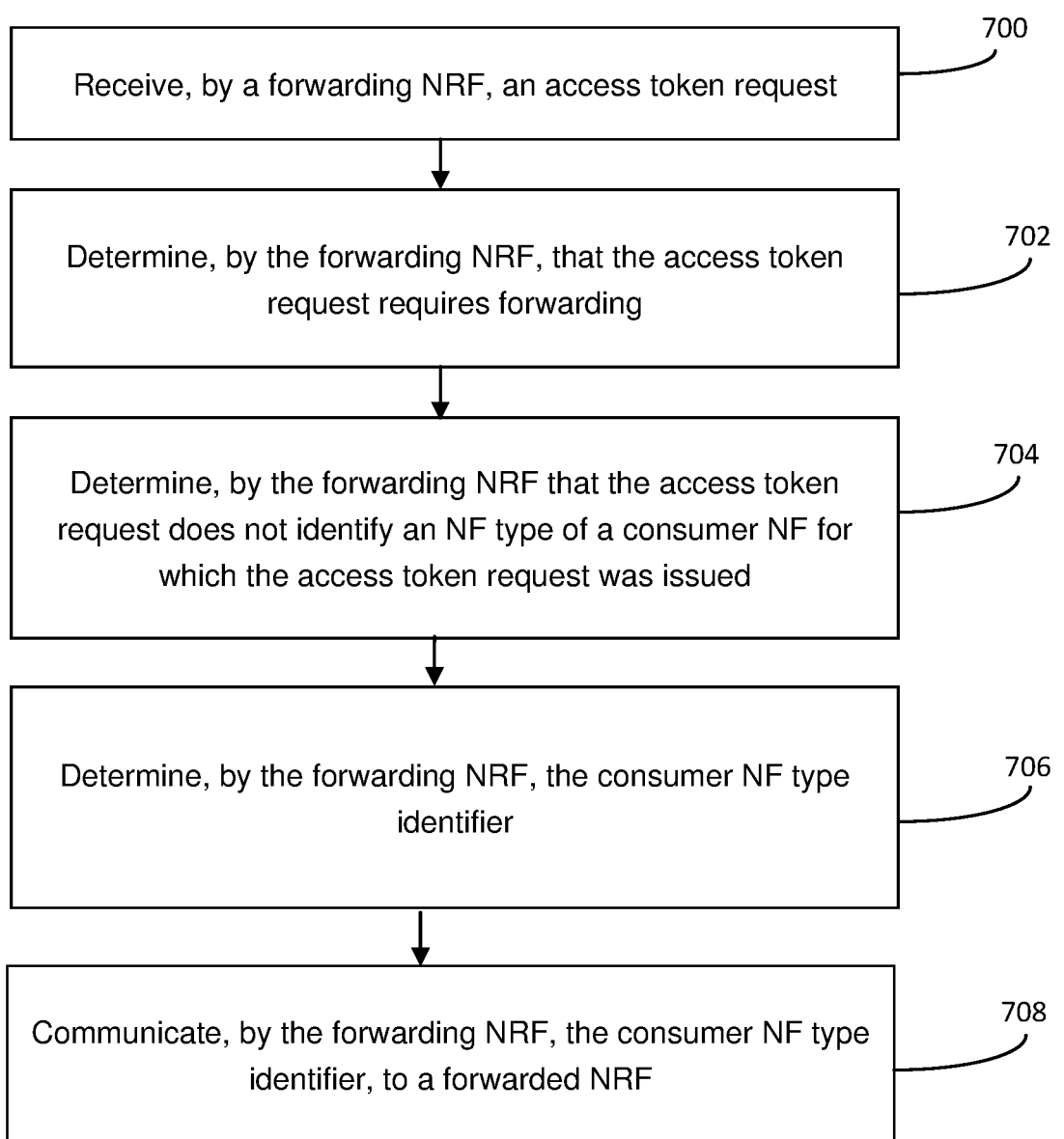

Receive, by a forwarding NRF, an access token request    700

Determine, by the forwarding NRF, that the access token request requires forwarding    702

Determine, by the forwarding NRF that the access token request does not identify an NF type of a consumer NF for which the access token request was issued    704

Determine, by the forwarding NRF, the consumer NF type identifier    706

Communicate, by the forwarding NRF, the consumer NF type identifier, to a forwarded NRF    708

FIG. 7

METHODS, SYSTEMS, AND COMPUTER READABLE MEDIA FOR INDICATING CONSUMER NETWORK FUNCTION (NF) TYPE FOR ACCESS TOKEN REQUESTS FORWARDED BETWEEN NF REPOSITORY FUNCTIONS (NRFs)

TECHNICAL FIELD

The subject matter described herein relates to facilitating processing of access token requests forwarded between networks. More particularly, the subject matter described herein relates to methods, systems, and computer readable media for indicating consumer NF types for access token requests forwarded between NRFs.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF service instance is an instance of a producer NF that provides a service. A given producer NF instance may include more than one NF service instance if the producer NF instance provides multiple services. It should also be noted that multiple producer NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that may occur in 5G and subsequent generation networks relates to validation of access token requests that are transmitted between NRFs. In 5G networks, the OAuth 2.0 authorization framework is used to control access to services. In this framework, consumer NFs function as authorization clients, the NRF functions as the authorization server, and producer NFs function as resource owners. To access a service, a consumer NF must obtain, from the NRF, an OAuth 2.0 access token specific to the producer NF type or producer NF instance from which service is desired. The consumer NF obtains the access token by transmitting an access token request to the NRF. The NRF, functioning as the OAuth 2.0 authorization server, validates the access token request, and, if the validation is successful, transmits the access token to the consumer NF in an access token response. The consumer NF then transmits a service based-interface (SBI) request message including the access token to a producer NF. The producer NF receives the SBI request, validates the access token, and provides access to the service.

In its role as the OAuth 2.0 authorization server, the NRF, in validating the access token request, may analyze the access token request to determine the NF type of the consumer NF. However, in the case of indirect communications according to 3GPP communication model D in which the access token request originates from an SCP instead of the consumer NF, the access token request carries the NF instance ID of the SCP, rather than the consumer NF. In such cases, the NRF can determine the consumer NF type from the user agent header included in the access token request. However, in instances where the NRF forwards the access token request to another NRF, the user agent header identifies the SCP, rather than the consumer NF. Because the access token request forwarded by another NRF lacks consumer NF identifying information, validation of the access token request using consumer NF type information read directly from the access token request is not possible.

Accordingly, in light of these and other difficulties, there exists a need for improved methods, systems, and computer readable media for facilitating processing of access token requests forwarded between NRFs.

SUMMARY

A method for indicating a consumer network function (NF) type for an access token request forwarded between NF repository functions (NRFs) includes receiving, by a forwarding NRF, an access token request. The method further includes determining, by the forwarding NRF, that the access token request requires forwarding. The method further includes determining, by the forwarding NRF, that the access token request does not identify an NF type of a consumer NF for which the access token request was issued. The method further includes determining, by the forwarding NRF, the consumer NF type identifier. The method further includes communicating, by the forwarding NRF, the consumer NF type identifier to a forwarded NRF.

According to another aspect of the subject matter described herein, receiving the access token request includes receiving an OAuth 2.0 access token request transmitted by a service communication proxy (SCP).

According to another aspect of the subject matter described herein, receiving the access token request transmitted by the SCP includes receiving the access token request transmitted by the SCP, which is performing indirect communications with delegated discovery on behalf of a consumer NF identified by the consumer NF type identifier according to 3GPP communication model D.

According to another aspect of the subject matter described herein, determining that the access token request requires forwarding includes determining that the access token request requests an access token of a producer NF that is not registered with the forwarding NRF.

According to another aspect of the subject matter described herein, determining that the access token request does not identify an NF type of a consumer NF for which the access token request was issued includes determining that the access token request includes a user agent header with a service communication proxy (SCP) identifier.

According to another aspect of the subject matter described herein, determining the consumer NF type identifier includes obtaining, from the access token request, a consumer NF instance identifier, accessing, using the consumer NF instance identifier, an NF profiles database of the forwarding NRF and locating an NF profile corresponding to the consumer NF instance identifier, and reading the consumer NF type identifier from the NF profile.

According to another aspect of the subject matter described herein, communicating the consumer NF type identifier to the forwarded NRF includes adding the consumer NF type identifier to the access token request and forwarding the access token request including the consumer NF type identifier to the forwarded NRF.

According to another aspect of the subject matter described herein, adding the consumer NF type identifier to the access token request includes adding a custom hypertext transfer protocol version 2 (HTTP2) header to the access token request and populating the custom HTTP2 header with the consumer NF type identifier.

According to another aspect of the subject matter described herein, adding the consumer NF type identifier to the access token request includes replacing an SCP identifier in a user agent header of the access token request with the consumer NF type identifier.

According to another aspect of the subject matter described herein, the method for indicating a consumer NF type for an access token request forwarded between NRFs includes, at the forwarded NRF, receiving the consumer NF type identifier and using the consumer NF type identifier to validate the access token request.

According to another aspect of the subject matter described herein, a system for indicating a consumer network function (NF) type for an access token request forwarded between NF repository functions (NRFs) is provided. The system includes a forwarding NRF including at least one processor and a memory. The system further includes an access token request handler implemented by the at least one processor for receiving an access token request, determining that the access token request requires forwarding, determining that the access token request does not identify an NF type of a consumer NF for which the access token request was issued, determining the consumer NF type identifier, and communicating the consumer NF type identifier to a forwarded NRF.

According to another aspect of the subject matter described herein, the access token request comprises an OAuth 2.0 access token request transmitted by a service communication proxy (SCP).

According to another aspect of the subject matter described herein, the access token request handler is configured to determine that the access token request requires forwarding when the access token request requests an access token of a producer NF that is not registered with the forwarding NRF. The system of claim 11 wherein the access token request handler is configured to determine that the access token request does not identify an NF type of a consumer NF for which the access token request was issued by determining that the access token request includes a user agent header with a service communication proxy (SCP) identifier.

According to another aspect of the subject matter described herein, the access token request handler is configured to determine the consumer NF type identifier by obtaining, from the access token request, a consumer NF instance identifier, accessing, using the consumer NF instance identifier, an NF profiles database of the forwarding NRF and locating an NF profile corresponding to the consumer NF instance identifier, and reading the consumer NF type identifier from the NF profile.

According to another aspect of the subject matter described herein, the access token request handler is configured to communicate the consumer NF type identifier to the forwarded NRF by adding the consumer NF type identifier to the access token request and forwarding the access token request including the consumer NF type identifier to the forwarded NRF.

According to another aspect of the subject matter described herein, the access token request handler is configured to add the consumer NF type identifier to the access token request by adding a custom hypertext transfer protocol version 2 (HTTP2) header to the access token request and populating the custom HTTP2 header with the consumer NF type identifier.

According to another aspect of the subject matter described herein, the access token request handler is configured to add the consumer NF type identifier to the access token request by replacing an SCP identifier in a user agent header of the access token request with the consumer NF type identifier.

According to another aspect of the subject matter described herein, the system for indicating the consumer NF type for access token requests transmitted between NRFs includes the forwarded NRF. The forwarded NRF is configured to receive the consumer NF type identifier and use the consumer NF type identifier to validate the access token request.

According to another aspect of the subject matter described herein, a non-transitory computer readable medium having stored thereon executable instructions that when executed by a processor of a computer control the computer to perform steps is provided. The steps include receiving, by a forwarding network function (NF) repository function (NRF), an access token request. The steps further include determining, by the forwarding NRF, that the access token request requires forwarding. The steps further include determining, by the forwarding NRF, that the access token request does not identify an NF type of a consumer NF for which the access token request was issued. The steps further include determining, by the forwarding NRF, the consumer NF type identifier. The steps further include communicating, by the forwarding NRF, the consumer NF type identifier to a forwarded NRF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which:

FIG. 7 is a flow chart illustrating an exemplary process for determining and communicating consumer NF type information to a forwarded NRF.

DETAILED DESCRIPTION

Figure 1:
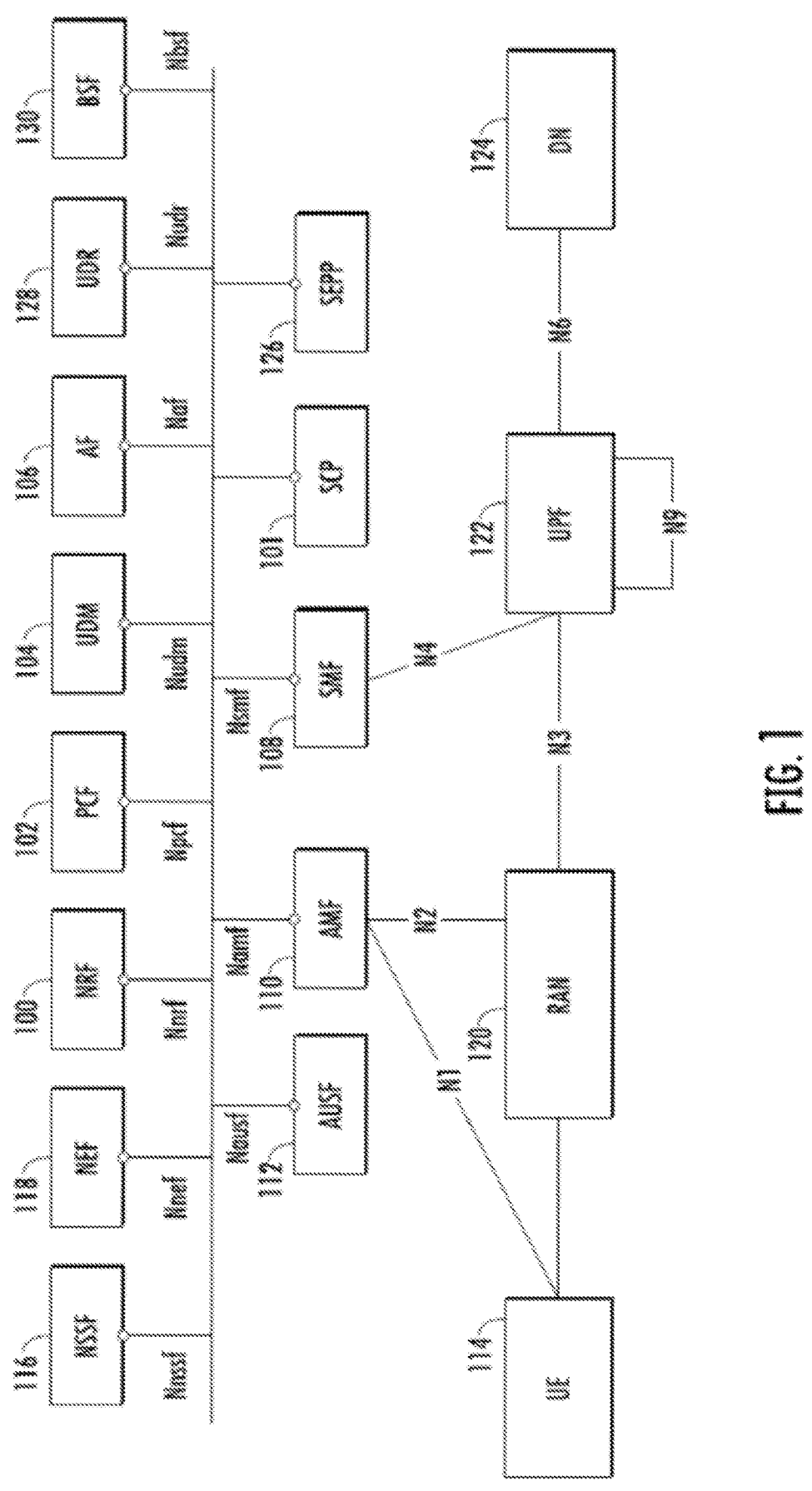
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances.

SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IOT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

As stated above, one problem that can occur in 5G and subsequent generation networks relates to validation of access token request messages transmitted between NRFs. As used herein, the term "forwarding NRF" refers to the NRF that forwards an access token request to another NRF. The term "forwarded NRF" refers to the NRF that receives and access token request from another NRF and attempts to validate the access token request. As will now be explained in detail, when an access token request originates from an SCP and is forwarded from the forwarding NRF to the forwarded NRF, the forwarded NRF is without sufficient NF type information to validate the access token request.

Figure 2:
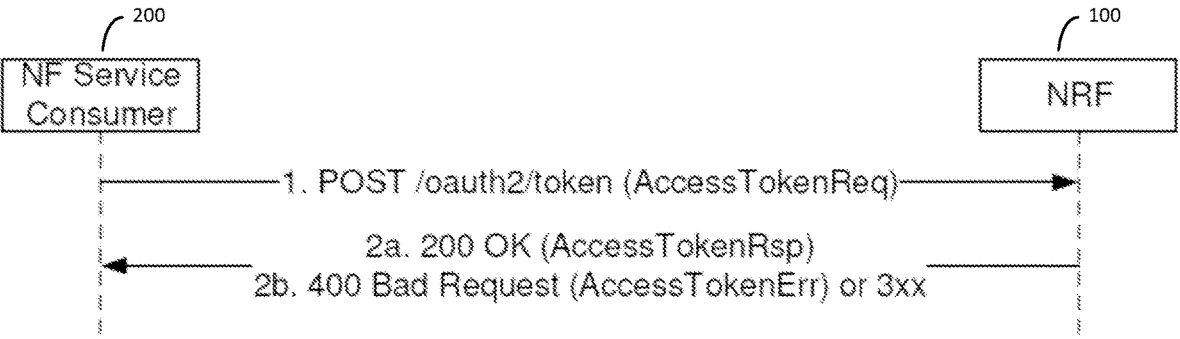
FIG. 2 is a message flow diagram illustrating exemplary messages exchanges between a consumer NF and an NRF according to the Nnrf_Access token service operation.

FIG. 2 is a message flow diagram illustrating exemplary messages exchanged between a consumer NF and an NRF according to the Nnrf_Access token service operation. Referring to FIG. 2, in step 1, NF service consumer 200 generates and sends an OAuth 2.0 access toke request. According to 3GPP TS 29.510, the access token request shall contain:

An OAuth 2.0 grant type set to "client_credentials";

The "scope" parameter indicating the names of the NF Services that the NF Service Consumer is trying to access (i.e., the expected NF service names);

The NF Instance Id of the NF Service Consumer requesting the OAuth 2.0 access token;

NF type of the NF Service Consumer, if this is an access token request not for a specific NF Service Producer;

NF type of the expected NF Service Producer, if this is an access token request not for a specific NF Service Producer;

The NF Instance Id of the expected NF Service Producer, if this is an access token request for a specific NF Service Producer;

Home and Serving PLMN IDs, if this is an access token request for use in roaming scenarios (see clause 13.4.1.2 of 3GPP TS 33.501 [15]).

Of particular interest to the subject matter described herein are the NF type and the NF instance ID of the NF service consumer. In the simple case illustrated in FIG. 2 without indirect communications via an SCP and without access token request forwarding between NRFs, the access token request contains the NF instance ID and NF type of NF service consumer 200. Accordingly, NRF 100 receives the access token request, uses the NF type of the expected service producer parameter to locate the NF profile(s) of one or more NF service producers, and validates the consumer NF type in the access token request against allowed NF type attributes in the NF profile(s). If the validation is successful, NRF 100 responds as indicated in step 2a with a 200 OK message containing the access token response. If the validation is unsuccessful, if an error occurs, or the access token request is redirected, the NRF responds as indicated in step 2b with a 4xx or 5xx message indicating that an error has occurred or a 3xx message indicating that the access token request has been redirected.

Figure 3:
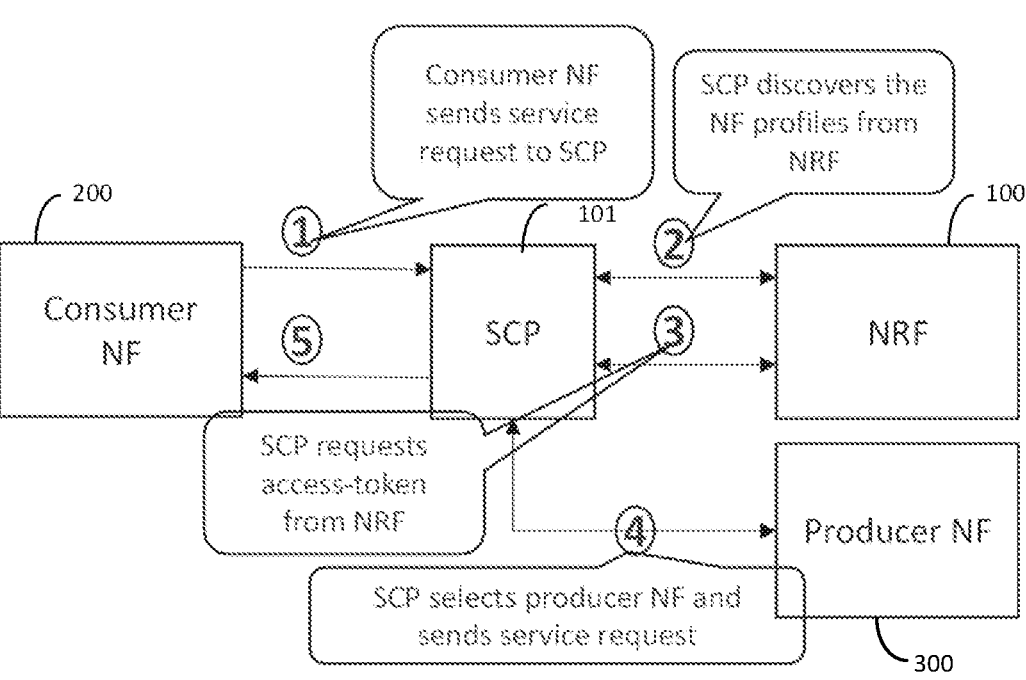
FIG. 3 is a message flow diagram illustrating communication according to 3GPP communication model D in which the SCP originates access token, NF discovery, and SBI requests on behalf of a consumer NF.

FIG. 3 is a message flow diagram illustrating communication according to 3GPP communication model D in which the SCP originates access token, NF discovery, and SBI requests on behalf of a consumer NF. Referring to FIG. 3, in step 1, consumer NF 200 sends a service request to SCP 101. SCP 101 receives the service request and, in step 2, initiates an NF discovery request to NRF 100. NRF 100 receives the NF discovery request, locates one or more NF profiles having attributes that match the query parameters in the NF discovery request, and responds to SCP 101 with an NF discovery response including the NF profiles.

In step 3, SCP 101 sends an access token request to NRF 100. The access token request includes the above-described parameters that identify the target NF instance ID and the target NF type. NRF 100 locates the corresponding NF profiles, reads the allowed NF type attributes from the NF profiles and compares the allowed NF type attributes to consumer NF type information determined from the access token request. In this case, NRF 100 relies on the NF instance ID of the consumer NF included as a mandatory parameter in the access token request to determine the consumer NF type. More particularly, NRF 100 uses the consumer NF instance ID to perform a lookup in the NF profiles database, locates the NF profile corresponding to the consumer NF instance ID, reads the consumer NF type from the NF profile, and compares the consumer NF type to the allowed NF types obtained from the NF profile of producer NF 300. For example, if the consumer NF type is AMF, and AMF is one of the allowed NF types of producer NF 300, NRF 100 may validate the access token request and return an access token to SCP 101. SCP 101 receives the access token, selects a producer NF instance, and, in step 4, sends the service request received in step 1 to selected producer NF instance 300.

Figure 4:
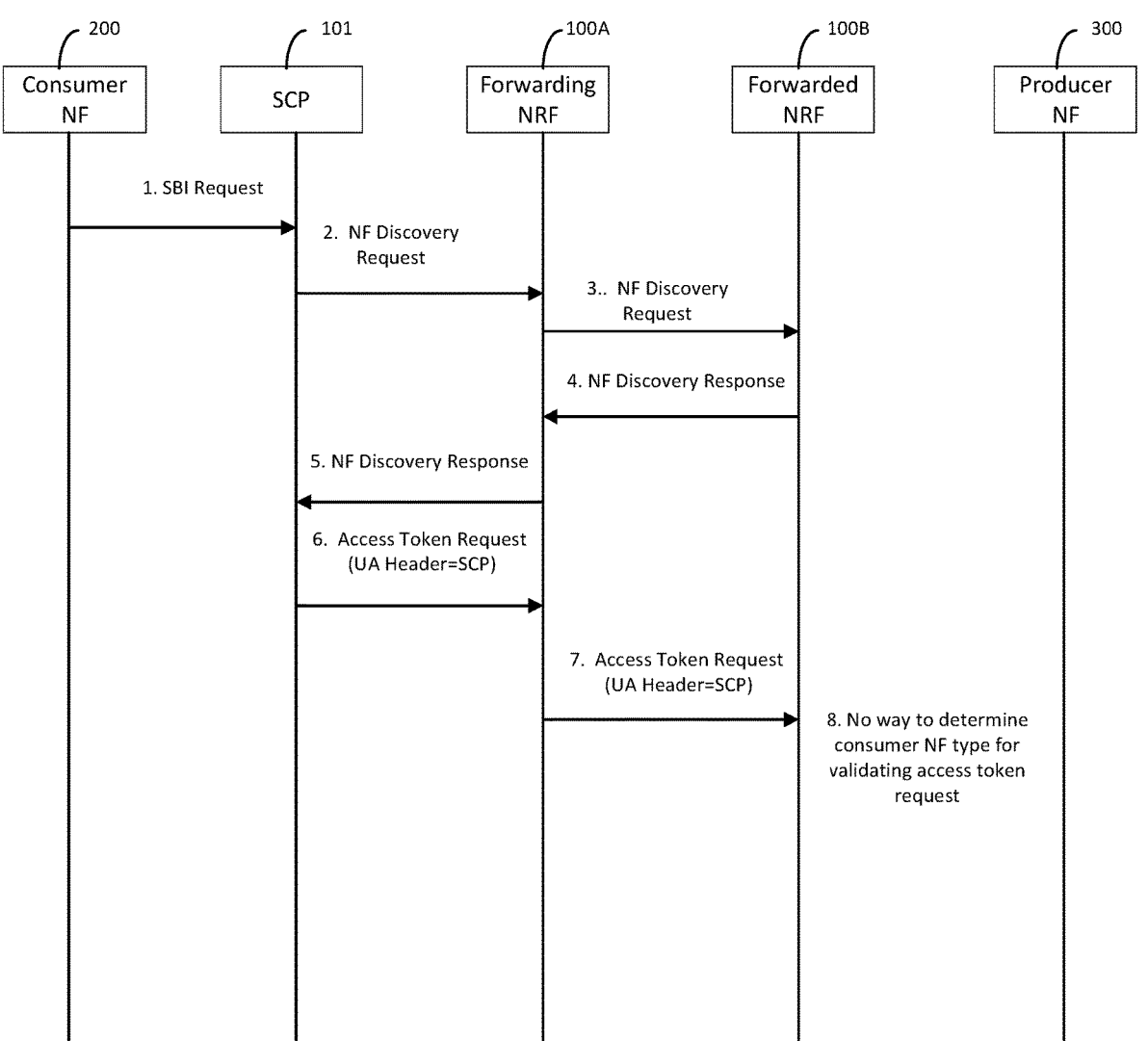
FIG. 4 is a message flow diagram illustrating exemplary messages exchanged according to 3GPP communication model D in which the SCP originates NF discovery and access token requests, where the requests are forwarded between NRFs, and where the forwarded NRF lacks sufficient consumer NF type information to validate the access token request.

FIG. 4 is a message flow diagram illustrating exemplary messages exchanged according to 3GPP communication model D in which the SCP originates NF discovery and access token requests, where the requests are forwarded between NRFs, and where the forwarded NRF lacks sufficient consumer NF type information to validate the access token request. Referring to FIG. 4, in step 1, consumer NF 200 sends a service request to SCP 101. The service request may be an SBI request other than an NF discovery or NF access token request. For example, if consumer NF 200 is an AMF, the service request may be an Nudm_UECM service request.

In step 2, SCP 101 sends an NF discovery request to forwarding NRF 100A. The NF discovery request identifies the target NF type (e.g., UDM) and contains a 3gpp-Sbi-Discovery-Requester-NF-Type HTTP header that identifies the NF type of consumer NF 200. Forwarding NRF 100A determines that it cannot respond to the NF discovery request and, in step 3, forwards the NF discovery request to forwarded NRF 100B. Forwarded NRF 100B receives the NF discovery request, validates the NF discovery request against allowed NF types for producer NF 300, generates an NF discovery response including the NF profile of producer NF 300, and, in step 4, forwards the NF discovery response to forwarding NRF 100A. In step 5, forwarding NRF 100A sends the NF discovery response to SCP 101.

SCP 101 selects a producer NF from the NF profiles in the NF discovery response and, in step 6, sends an access token request to forwarding NRF 100A. The access token request includes the NF instance ID of consumer NF 200 and a user agent header that identifies SCP 101. The user agent header contents are specified in Table 5.2.2.2-1 of 3GPP TS 29.500, a portion of which is as follows:

TABLE 1

| User Agent Header Definition from 3GPP TS 29.500 | | |
| --- | --- | --- |
| Name | Reference | Description |
| User-Agent | IETF RFC 9110 | HTTP/2 client. This header should be included in every HTTP/2 request sent over any SBI; This header shall be included in every HTTP/2 request sent using indirect communication when target NF (re-)selection is to be performed at SCP. For Indirect communications, the User-Agent header in a request that is: |

TABLE 1-continued

User Agent Header Definition from 3GPP TS 29.500

| Name | Reference | Description |
|------|-----------|-------------|
| | | forwarded by the SCP (with or without delegated discovery) shall identify the NF type of the original NF that issued the request (i.e. the SCP shall forward the header received in the incoming request); originated by the SCP towards the NRF (e.g. NF Discovery or Access Token Request) shall identify the SCP. |

In the above-quoted passage, 3GPP TS 29.500 indicates that the user agent header for access token and NF discovery requests identifies the SCP, rather than the consumer NF. As indicated above, for NF discovery requests, this is not an issue for NRF-forwarded requests because the requester NF type is a mandatory parameter in NF discovery requests. However, for access token requests, there is no mandatory parameter that carries the NF type of the consumer NF, and the forwarded NRF cannot use the NF instance ID of the consumer NF to locate the NF profile of the consumer NF because the forwarded NRF does not include the NF profile of the consumer NF.

In step 7, forwarding NRF 100A sends the access token request to forwarded NRF 100B. In step 8, forwarded NRF 100B is unable to validate the access token request against allowed NF types of producer NF 300 because the access token request includes the NF type of SCP 101, rather than consumer NF 200. The user agent header likewise identifies SCP 101. Even though the access token request includes the NF instance ID of consumer NF 200, forwarded NRF 100B cannot user the NF instance ID of consumer NF 200 to determine the NF type of consumer NF 200. Accordingly, processing of the access token request may fail.

Figure 5A:
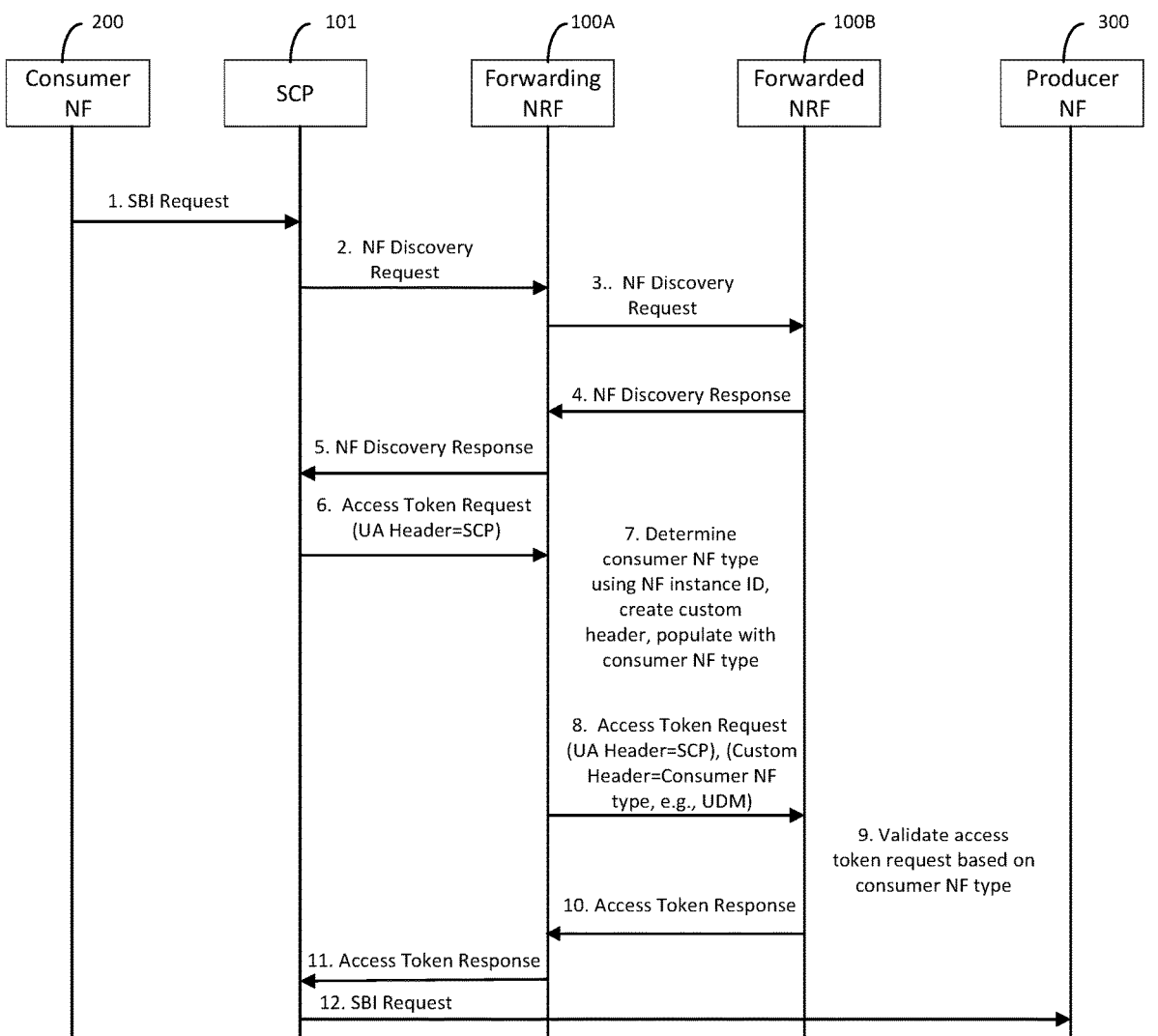
FIG. 5A is a message flow diagram illustrating exemplary messages exchanged according to 3GPP communication model D in which the SCP originates NF discovery and access token requests, where the requests are forwarded between NRFs, and the forwarding NRF determines and communicates consumer NF type information to the forwarded NRF via a custom hypertext transfer protocol version 2 (HTTP2) header.

FIG. 5A is a message flow diagram illustrating exemplary messages exchanged according to 3GPP communication model D in which the SCP originates NF discovery and access token requests, where the requests are forwarded between NRFs, and the forwarding NRF determines and communicates consumer NF type information to the forwarded NRF via a custom HTTP header. Referring to FIG. 5A, in step 1, consumer NF 200 sends a service request to SCP 101. The service request may be an SBI request other than an NF discovery or NF access token request. For example, if consumer NF 200 is an AMF, the service request may be an Nudm_UECM service request.

In step 2, SCP 101 sends an NF discovery request to forwarding NRF 100A. The NF discovery request identifies the target NF type (e.g., UDM) and contains a 3gpp-Sbi-Discovery-Requester-NF-Type HTTP header that identifies the NF type of consumer NF 200. Forwarding NRF 100A determines that it cannot respond to the NF discovery request and, in step 3, forwards the NF discovery request to forwarded NRF 100B. Forwarded NRF 100B receives the NF discovery request, validates the NF discovery request against allowed NF types for producer NF 300, generates an NF discovery response including the NF profile of consumer NF 200, and, in step 4, forwards the NF discovery response to forwarding NRF 100A. In step 5, forwarding NRF 100A sends the NF discovery response to SCP 101.

SCP 101 selects a producer NF from the NF profiles in the NF discovery response and, in step 6, sends an access token request to forwarding NRF 100A. The access token request includes the NF instance ID of consumer NF 200 and a user agent header that identifies SCP 101.

In step 7, forwarding NRF 100A determines the consumer NF type of consumer NF 200 using the NF instance ID of consumer NF 200 that is included as a mandatory parameter in the access token request. More particularly, forwarding NRF 100A reads an identifier identifying the consumer NF type from the access token request and performs a lookup in the NF profiles database maintained by forwarding NRF 100A using the identifier for the consumer NF type as a lookup key. In this example, it is assumed that consumer NF 200 is in the same network as forwarding NRF 100A and that consumer NF 200 has registered with forwarding NRF 100A. Accordingly, forwarding NRF 100B locates the NF profile of consumer NF 200, reads an identifier identifying the NF type of consumer NF 200 from the NF profile, generates a custom HTTP2 header, populates the custom header with the identifier identifying the NF type of consumer NF 200, and adds the custom header to the access token request.

In step 8, forwarding NRF 100A sends the access token request to forwarded NRF 100B. In step 9, forwarded NRF 100B validates the access token request against allowed NF types of producer NF 300. More particularly, forwarded NRF 100B reads the NF type identifier from the custom header, compares the NF type identifier to the allowed NF type identifiers of producer NF 300, and, in this case, determines that the NF type identifier corresponds to an allowed NF type. Accordingly, in step 10, forwarded NRF 100B generates an access token response including one or more access tokens of producer NF 300 and transmits the access token response to forwarding NRF 100A. In step 11, forwarding NRF 100A sends the access token response to SCP 101. In step 12, SCP 101 sends an SBI request including the access token to producer NF 300. Producer NF 300 uses the access token to validate the request, and, if validation is successful, provides the requested service to consumer NF 200.

Figure 5B:
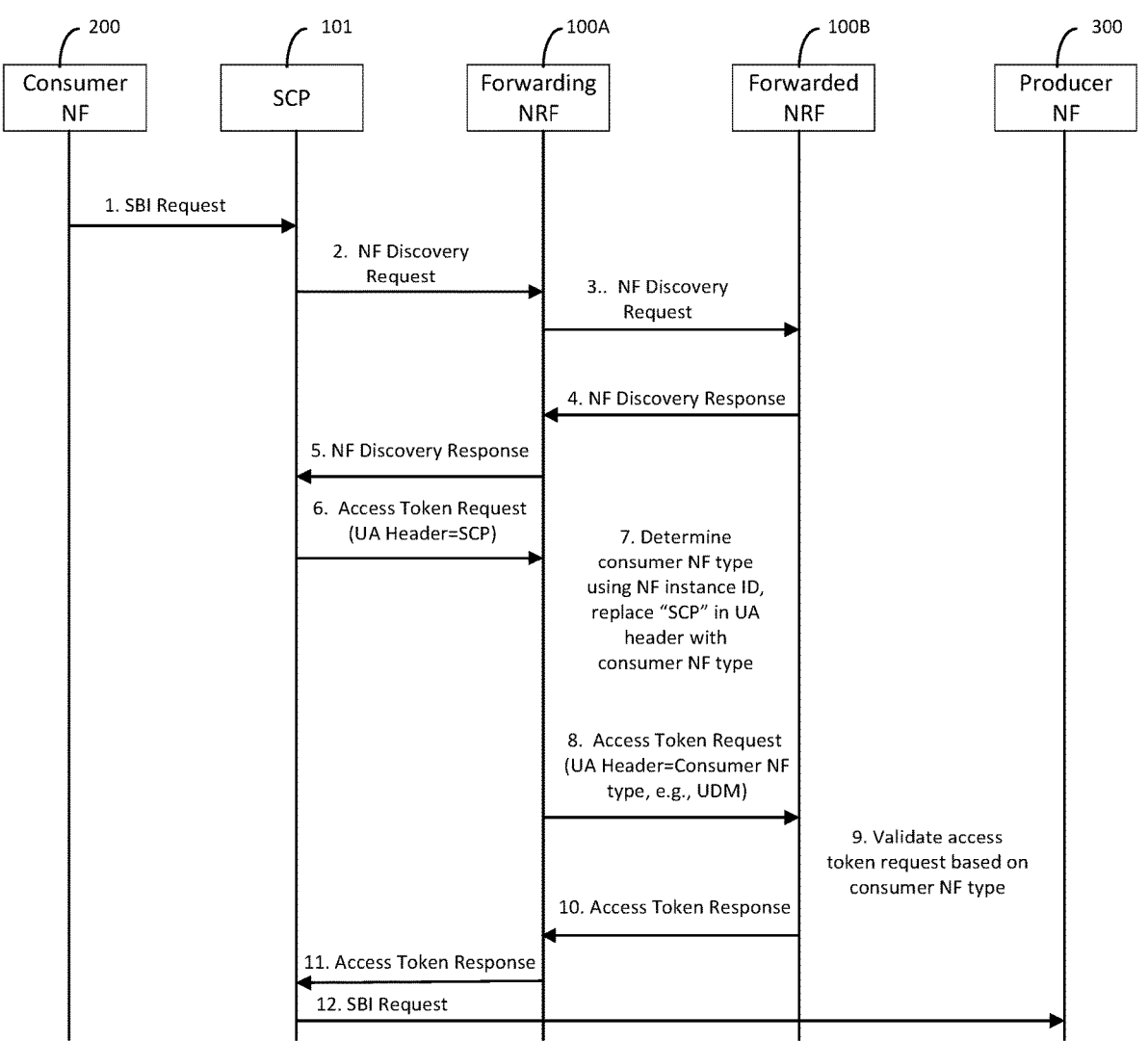
FIG. 5B is a message flow diagram illustrating exemplary messages exchanged according to 3GPP communication model D in which the SCP originates NF discovery and access token requests, where the requests are forwarded between NRFs, and the forwarding NRF determines and communicates consumer NF type information to the forwarded NRF via a user agent header.

FIG. 5B is a message flow diagram illustrating exemplary messages exchanged according to 3GPP communication model D in which the SCP originates NF discovery and access token requests, where the requests are forwarded between NRFs and the forwarding NRF determines and communicates consumer NF type information to the forwarded NRF via the user agent header. The message flow in FIG. 5B is the same as that in FIG. 5A. The only differences are in steps 7-9. In step 7, forwarding NRF 100A reads the NF instance ID of consumer NF 200 from the access token request, uses the NF instance ID to access its NF profiles database, locates the NF profile of consumer NF 200, and reads the NF type identifier of consumer NF 200 from the NF profile. Forwarding NRF 100A then replaces the NF type identifier of SCP 101 in the user agent header of the access token request with the NF type identifier of consumer NF 200. In step 8, forwarding NRF 100A forwards the access token request to forwarded NRF 100B. In step 9, forwarded NRF 100B receives the access token request, reads the NF type identifier of consumer NF 200 from the user agent header, and compares the NF type identifier of consumer NF 200 with allowed NF types of producer NF 300. In this example, it is assumed that forwarded NRF 100B successfully validates the access token request. In step 10, forwarded NRF 100B sends the access token response to SCP 101. In step 11, SCP 101 sends an SBI request including the access token to producer NF 300. Producer NF 300 uses the access token to validate the request, and, if validation is successful, provides the requested service to consumer NF 200.

Figure 6:
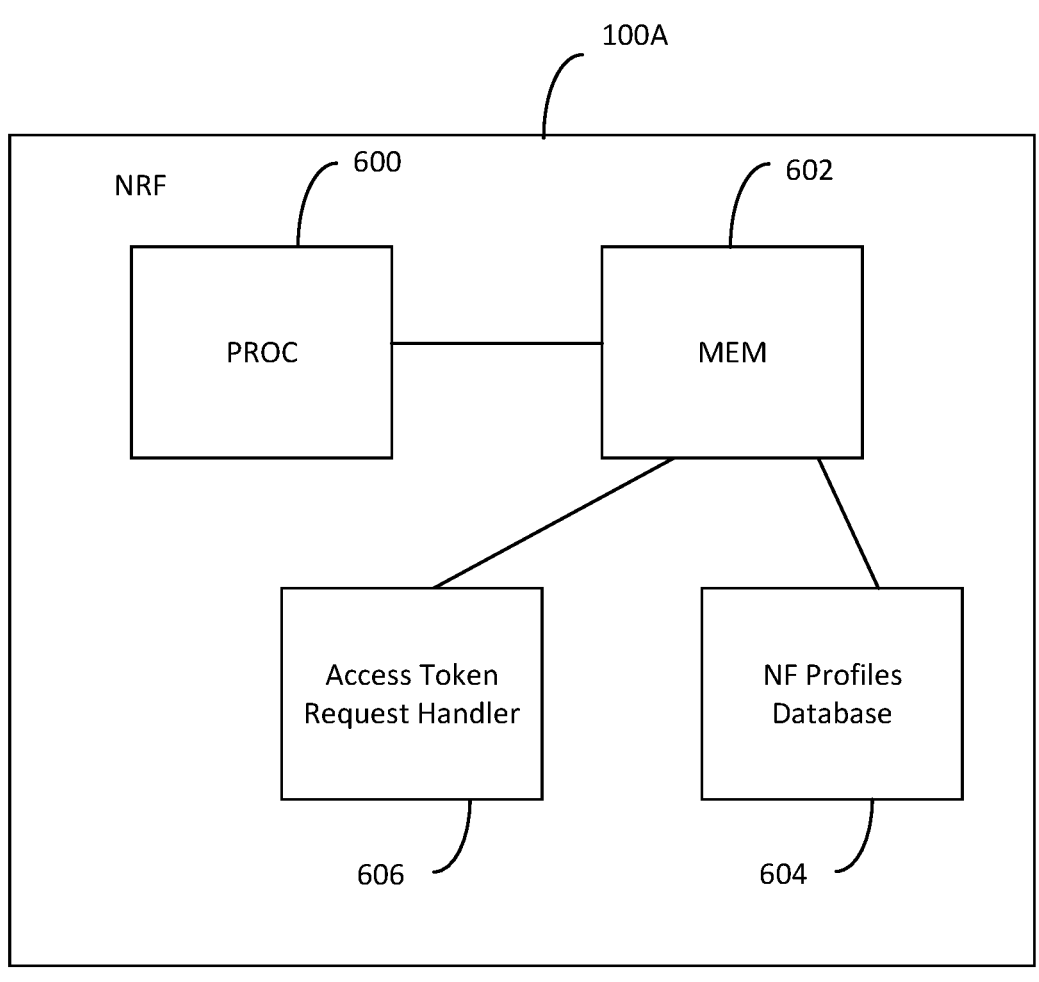
FIG. 6 is a block diagram illustrating an exemplary architecture of a forwarding NRF for determining and communicating consumer NF type information to a forwarded NRF.

FIG. 6 is a block diagram illustrating an exemplary architecture of a forwarding NRF for determining and communicating consumer NF type information to a forwarded NRF. Referring to FIG. 6, forwarding NRF 100A includes at least one processor 600 and memory 602. Forwarding NRF 100A also includes an NF profiles database 604 stored in memory 602. NF profiles database 604 may contain NF profiles of producer NFs registered with forwarding NRF 100A. Forwarding NRF 100A further includes an access token request handler 606 that receives access token requests, identifies access token requests from SCPs that do not include requester NF type information that identifies the consumer NF type (other than consumer NF type=SCP), determines the consumer NF type, and communicates the consumer NF type to a forwarded NRF. In one example, as illustrated in FIG. 5A, forwarding NRF 100A may generate a custom HTTP2 header and add the consumer NF type information to the custom HTTP2 header. In another example, illustrated in FIG. 5B, forwarding NRF 100B may replace the SCP type information in the user agent header with the consumer NF type identifier. The use of the user agent header to carry the consumer NF type information is useful in cases where the forwarded an forwarding NRFs are from different vendors and do not both support the custom HTTP2 header.

It should be noted that forwarding NRF 100A may also function as a forwarded NRF 100B for access token requests relating to producer NFs registered with forwarding NRF. That is, forwarding NRF 100A may receive access token requests with consumer NF type identifying information in the custom HTTP2 header or the user agent header and use the consumer NF type identifying information to validate the access token request against allowed NF type information of target producer NFs registered with forwarding NRF 100A.

FIG. 7 is a flow chart illustrating an exemplary process for determining and communicating consumer NF type information to a forwarded NRF. Referring to FIG. 7, in step 700, the process includes receiving, by a forwarding NRF, an access token request. For example, an NRF, such as forwarding NRF 100A, may receive an access token request from an SCP.

In step 702, the process includes determining, by the forwarding NRF, that the access token request requires forwarding. For example, forwarding NRF 100A may determine that the access token request includes an NF instance ID of a producer NF that is not registered with forwarding NRF 100A.

In step 704, the process further includes determining, by the forwarding NRF, that the access token request does not identify an NF type of a consumer NF for which the access token request was issued. For example, forwarding NRF 100A may determine that the target NF type identifies an SCP, rather than a non-SCP consumer NF that is using the SCP for delegated discovery and indirect routing according to 3GPP communication model D.

In step 706, the process further includes determining, by the forwarding NRF, the consumer NF type identifier. For example, forwarding NRF 100A may read the consumer NF instance ID from the access token request, use the NF instance ID to perform a lookup in the NF profiles database, locate an NF profile corresponding to the consumer NF instance ID, and read the consumer NF type from the NF profile.

In step 708, the process further includes communicating, by the forwarding NRF, the consumer NF type identifier to a forwarded NRF. For example, forwarding NRF 100A may add the consumer NF type identifier to the access token request, either in a custom HTTP2 header or in the user agent header, and forward the access token request including the consumer NF type identifier to forwarded NRF 100B. Forwarded NRF 100B may compare the consumer NF type identifier to allowed NF types of the target producer NF to determine whether to provide the access token to the requesting SCP in the access token response. If forwarded NRF 100B determines that the consumer NF type is an allowed consumer NF type, forwarded NRF 100B may include the access token in the access token response. If forwarded NRF 100B determines that the consumer NF type is not an allowed consumer NF type, forwarded NRF 100B may reject the access token request and/or return and error response.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.4.0 (2023-09)
2. 3$^{rd}$ Generation Partnership Project; Technical Specification Group Core Network and Terminals; 5G System; Technical Realization of Service Based Architecture; Stage 3 (Release 18) 3GPP TS 29.500 V18.4.0 (2023-12)
3. Hardt, D., The OAuth 2.0 Authorization Framework, IETF RFC 6749 (October 2012).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for indicating a consumer network function (NF) type for an access token request forwarded between NF repository functions (NRFs), the method comprising:

receiving, by a forwarding NRF, from a service communication proxy (SCP) and on behalf of a consumer NE, an access token request that includes a user agent header that identifies the SCP instead of the consumer NE;

determining, by the forwarding NRF, that the access token request requires forwarding;

determining, by the forwarding NRF, a consumer NF type identifier of the consumer NF; and communicating, by the forwarding NRF, the consumer NF type identifier to a forwarded NRF, wherein communicating the consumer NF type identifier to the forwarded NRF includes adding the consumer NF type identifier to the access token request and forwarding the access token request including the consumer NF type identifier to the forwarded NRF.

2. The method of claim 1 wherein receiving the access token request includes receiving an OAuth 2.0 access token request.

3. The method of claim 2 wherein receiving the access token request transmitted by the SCP includes receiving the access token request transmitted by the SCP, which is performing indirect communications with delegated discovery on behalf of the consumer NF identified by the consumer NF type identifier according to 3GPP communication model D.

4. The method of claim 1 wherein determining that the access token request requires forwarding includes determining that the access token request requests an access token of a producer NF that is not registered with the forwarding NRF.

5. The method of claim 1 wherein determining the consumer NF type identifier includes:

obtaining, from the access token request, a consumer NF instance identifier;

accessing, using the consumer NF instance identifier, an NF profiles database of the forwarding NRF and locating an NF profile corresponding to the consumer NF instance identifier; and reading the consumer NF type identifier from the NF profile.

6. The method of claim 1 wherein adding the consumer NF type identifier to the access token request includes adding a custom hypertext transfer protocol version 2 (HTTP2) header to the access token request and populating the custom HTTP2 header with the consumer NF type identifier.

7. The method of claim 1 wherein adding the consumer NF type identifier to the access token request includes replacing an SCP identifier in the user agent header of the access token request with the consumer NF type identifier.

8. The method of claim 1 comprising, at the forwarded NRF, receiving the consumer NF type identifier and using the consumer NF type identifier to validate the access token request.

9. A system for indicating a consumer network function (NF) type for an access token request forwarded between NF repository functions (NRFs), the system comprising:

a forwarding NRF including at least one processor and a memory; and an access token request handler implemented by the at least one processor for receiving from a service communication proxy (SCP) and on behalf of a consumer NF, an access token request that includes a user agent header that identifies the SCP instead of the consumer NE, determining that the access token request requires forwarding, determining a consumer NF type identifier of the consumer NE, and communicating the consumer NF type identifier to a forwarded NRF, wherein communicating the consumer NF type identifier to the forwarded NRF includes adding the consumer NF type identifier to the access token request and forwarding the access token request including the consumer NF type identifier to the forwarded NRF.

10. The system of claim 9 wherein the access token request comprises an OAuth 2.0 access token request.

11. The system of claim 9 wherein the access token request handler is configured to determine that the access token request requires forwarding when the access token request requests an access token of a producer NF that is not registered with the forwarding NRF.

12. The system of claim 9 wherein the access token request handler is configured to determine the consumer NF type identifier by:

obtaining, from the access token request, a consumer NF instance identifier;

accessing, using the consumer NF instance identifier, an NF profiles database of the forwarding NRF and locating an NF profile corresponding to the consumer NF instance identifier; and reading the consumer NF type identifier from the NF profile.

13. The system of claim 9 wherein the access token request handler is configured to add the consumer NF type identifier to the access token request by adding a custom hypertext transfer protocol version 2 (HTTP2) header to the access token request and populating the custom HTTP2 header with the consumer NF type identifier.

14. The system of claim 9 wherein the access token request handler is configured to add the consumer NF type identifier to the access token request by replacing an SCP identifier in the user agent header of the access token request with the consumer NF type identifier.

15. The system of claim 9 comprising the forwarded NRF, wherein the forwarded NRF is configured to receive the consumer NF type identifier and use the consumer NF type identifier to validate the access token request.

16. A non-transitory computer readable medium having stored thereon executable instructions that when executed by a processor of a computer control the computer to perform steps comprising:

receiving, by a forwarding network function (NF) repository function (NRF) from a service communication proxy (SCP), and on behalf of a consumer NE, an access token request;

determining, by the forwarding NRF, that the access token request requires forwarding;

determining, by the forwarding NRF, a consumer NF type identifier of the consumer NE; and communicating, by the forwarding NRF, the consumer NF type identifier to a forwarded NRF, wherein communicating the consumer NF type identifier to the forwarded NRF includes adding the consumer NF type identifier to the access token request and forwarding the access token request including the consumer NF type identifier to the forwarded NRF.

* * * * *